Jan. 19, 1960  P. SCHNECKE  2,922,133
COMMUTATING REACTOR
Filed Jan. 9, 1956  3 Sheets-Sheet 1
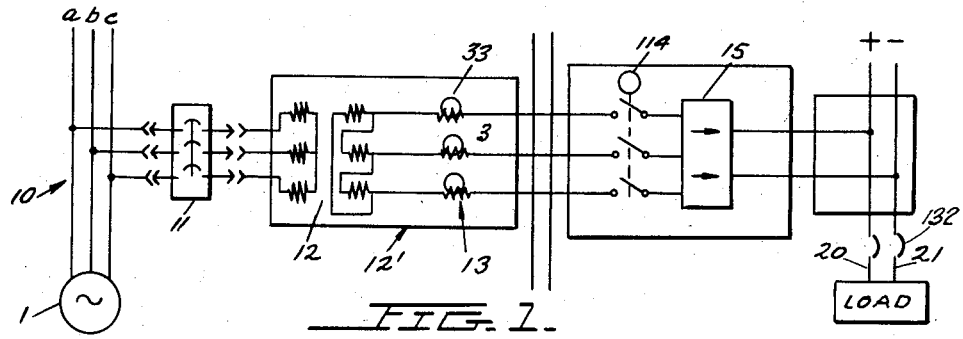
FIG. 1.
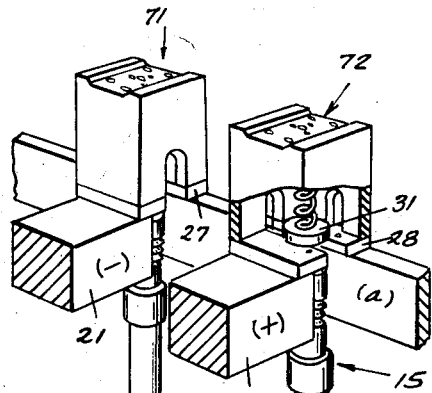
FIG. 2.
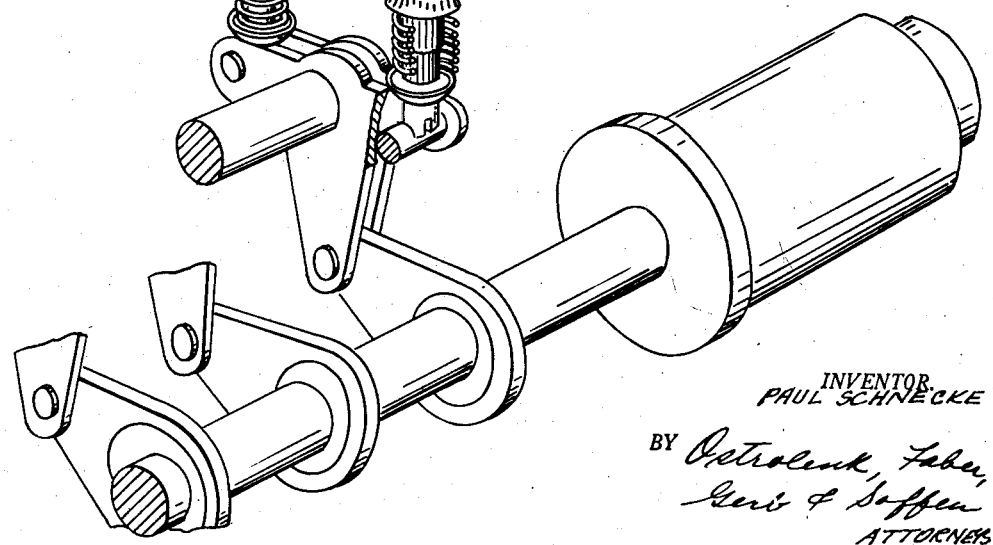
INVENTOR
PAUL SCHNECKE
BY Ostrolenk, Faber,
Gerb & Soffen
ATTORNEYS

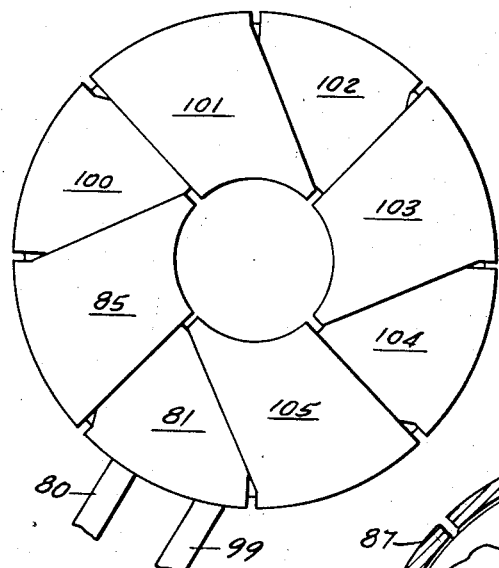
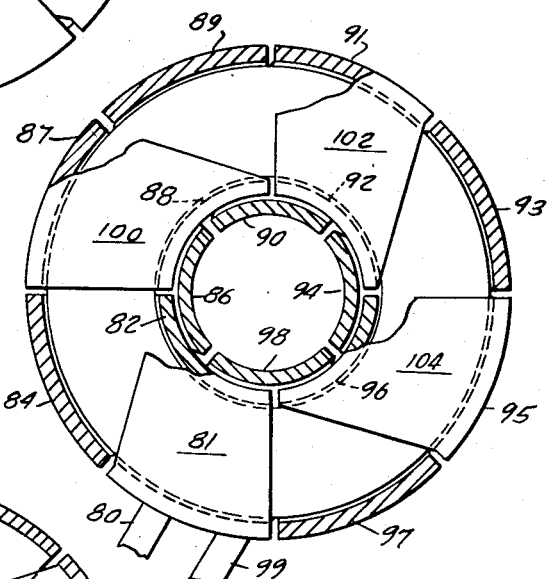
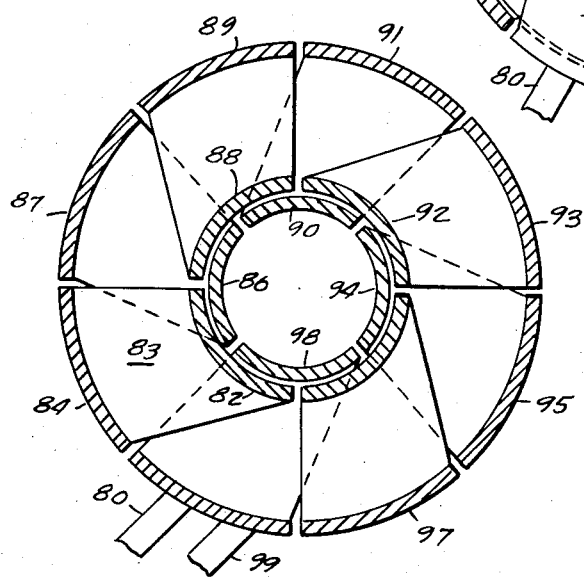

INVENTOR.
PAUL SCHNECKE

BY
ATTORNEYS

United States Patent Office 2,922,133
Patented Jan. 19, 1960

2,922,133

COMMUTATING REACTOR

Paul Schnecke, Berlin-Siemensstadt, Germany, assignor to Siemens-Schuckertwerke A.G., Berlin and Erlangen, Germany, a corporation of Germany Application January 9, 1956, Serial No. 558,112

Claims priority, application Germany January 10, 1955

5 Claims. (Cl. 336—180)

My invention relates to a toroidal winding for reactors having an enclosed core and more specifically to a commutating reactor for application with mechanical and electromagnetic rectifiers of the type shown in copending applications Serial No. 257,398, filed November 20, 1951, now Patent No. 2,756,380, and Serial No. 301,880, filed July 31, 1952, now Patent No. 2,759,128.

A mechanical rectifier produces direct voltage by making metallic contact between a proper phase of an A.C. system and the associated D.C. system during the time interval the particular phase of the A.C. system is capable of delivering energy in the desired direction, and breaking the metallic contact when the A.C. phase reverses its voltage in relationship to the D.C. voltage. This operation is performed sequentially and repeatedly in synchronism with the A.C. frequency.

The metallic contacts which perform the switching are switches which are able to carry the full current which flows through the rectifier. These contacts, when open, are able to withstand the full inverse voltage, when the alternate voltage is opposed to the direct voltage. But they cannot interrupt a current greater than a fraction of one ampere without suffering a slight damage. Due to the periodical operation of the switches (they must each operate 60 times per second in a 60 cycle system), the slight damage to the contact, if they are called upon to interrupt any substantial current soon accumulates to a total destruction of the contact surface.

Another limitation is the inrush current after closing the contact. A contact does not close instantly. During closing the contacts touch very lightly over a small area thus providing a high resistance. As the contacting area and pressure increases, the contact resistance is correspondingly reduced. The time required for this phenomenon is twenty to thirty microseconds. If a high current is permitted during this interval, the narrow contact area will melt and thus be the cause of transfer of metal. Furthermore, the contact might rebound partially or totally after approximately one hundred microseconds. If the reverse motion is strong enough to reduce the contact pressure appreciably, some more transfer of metal will ensue. The transfer of metal will again be the cause of destruction because it is cumulative. To use such a switch as a mechanical rectifier, without any additional protective equipment will immediately result in its destruction.

To prevent such damage, saturable commutating reactors are inserted in series with the contacts. These reactors have a substantially square shaped, so-called hysteresis loop which present high resistance at low current and thus limit the inrush current after closing, and the residual current before opening, to a sufficiently low value to warrant a satisfactory performance for many billion operations.

The rectifier contacts are arranged to open during the interval just after the current passes through zero. At this time, the hysteresis loop is very steep, the rate of change of flux very large and accordingly the reactance of the saturable reactor very large compared to a normal load. The amplitude of the current flowing in the system instead of changing in accordance with the normal sinewave is, therefore, held at a comparatively low value during the switching interval.

The main winding of the commutating reactor must be designed to carry the full load current of the mechanical rectifier. Thus in commercial applications these windings must have sufficient cross-sectional area to carry rectified load currents of the magnitude of 5,000 and 10,000 amperes. These windings are wrapped around a cylindrical core of Permeron. The Permeron core material, having a composition of 40 to 50% Ni, has a flux-charge characteristic which closely approaches those of an ideal magnetic material and thus has a high impedance which flux-charge is taking place and negligible impedance when the core is saturated. The effect is to restrain current (step length) flow while the magnetization is making a complete reversal in either direction and to permit full current flow the instant the core is saturated. The main winding is wound on this hollow cylindrical core parallel to the axis thereof with each completed turn of the conductor on the outside and inside surface of the hollow cylinder.

However, if a uniform gage conductor is used for the windings the inside smaller circumference of the hollow cylindrical core would have to accommodate the same quantity of large cross-sectional conductors as the larger outside circumference and would therefore necessitate a large cumbersome cylindrical core. In practice it has been found that the large core which would thus be required would be uneconomical, a waste of space, impractical from the point of view of manufacture and installation; and furthermore could not be practically assembled in a common casing with the transformer as will hereinafter be more fully explained.

Furthermore, the large core required by conductors of uniform cross-section has one basic magnetic disadvantage. Namely, the mean length of the magnetic path in the Permeron core material would be too high resulting in an excessive magnetizing current which in turn would result in an excessive contact current. However, with my present invention reduction of mean length of magnetic path is of the order of 50%.

My invention relates to a novel and inventive structural arrangement to overcome the above enumerated disadvantages which result from the necessity of using a large cylindrical core in order to provide sufficient space requirements on the inside circumference for conductors of uniform cross-sectional area.

More specifically, my invention utilizes an inner conductor as a part of the continuous toroidal winding, wherein the peripheral length of the inner conductor is relatively large and the radial dimension of the inner conductor is relatively small. In view of the relatively small radial dimension, it is now possible to maintain eddy current effects to a minimum and the presence of the relatively large peripheral dimension assures the appropriate cross-sectional area required for current conduction. In view of the increased peripheral dimension, however, I find that at least one of the inner conductors must be radially displaced from the other conductors, since if this were not the case, the total circumferential dimension of the inner conductors would exceed the available circumferential dimension of the inner diameter of the magnetic core.

In a more specific case, I have found it desirable to radially displace the inner conductors of adjacent turns from one another, wherein a first and second layer of inner conductors is provided, with the opening of the magnetic core, and the inner conductors of adjacent turns overlap one another.

This novel principle may be further extended to the case, where the inner conductors of the toroidal windings on the magnetic core are shaped in the form of a hollow cylinder.

Hence, in the case of a plurality of inner conductors, there will be a plurality of concentric hollow conductors, which are cyclically connected to the outer conductors by means of connecting members. Here again, the radial dimension of each of the hollow cylinders is relatively small to maintain low eddy current effect while the circumferential dimension of the turn is relatively large compared to the radial dimension, so as to maintain a sufficient cross-sectional area for current conduction.

Accordingly, the primary object of my invention is to provide a toroidal winding for an enclosed magnetic core.

Another object of my invention, is to provide a reactor having an enclosed magnetic core and a toroidal winding, wherein at least one of the inner conductors of the winding is radially displaced from the other inner conductors.

Another object of my invention, is to provide a toroidal winding wherein at least one of the inner conductors is radially displaced from the other inner conductors, and is in overlapping relationship with one or more of the other inner conductors.

Another object of my invention is to provide a toroidal winding for commutating reactors, wherein eddy current effects in the inner conductors is substantially decreased by constructing the inner conductors to be positioned in an overlapping relationship, and to maintain a relatively small radial dimension for the inner conductors.

A still further object of my invention is to provide a reactor having an enclosed core and a toroidal winding wound thereon, wherein the inner conductors of the toroidal winding are concentric hollow cylinders, having a relatively small radial dimension.

These and other objects of my invention will be apparent from the following description when taken in connection with the drawings in which:

Figure 1 is a schematic electrical diagram of a mechanical rectifier, which could utilize commutating reactors constructed in accordance with my novel invention.

Figure 2 is a perspective view of the push-rod assembly and contact assembly of the contact converter for the mechanical rectifier.

Figure 3 shows a top view of a reactor having a toroidal winding constructed in accordance with my novel invention.

Figure 4 shows the view of Figure 3, with the upper conducting members broken away to afford observation of the inner and outer conductors.

Figure 5 is a further view similar to Figure 3, wherein the connecting conductors at the bottom of the core are shown as dotted lines, and all of the upper conductors have been broken away.

Figure 6:
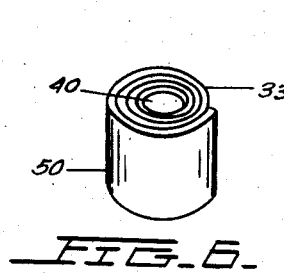
Figure 6 is a view in perspective of the hollow cylindrical core utilized in the reactor of my invention.

The source of alternating current is taken from the alternating current lines 10 through the circuit breaker 11 to step down transformer 12. The source current is then passed through the commutating reactors 13 to "step" the current for switching purposes as set forth in application Serial No. 212,017 filed February 21, 1951.

The current passes through disconnect switches 14 to the contact converter 15. The contact converter 15 sequentially and repeatedly in synchronism with the A.C. frequency connects the alternating current source buses 10a, b, c, to the D.C. load buses 20—21 and load 5 through the D.C. protective equipment 132.

The bridge connected contact converter 15 may contain two sets of contacts, (not shown) a negative set and a positive set. The two sets of contacts are offset 180 electrical degrees from each other and the contacts in either positive or negative set for all the phases a, b and c are set 120° apart. The circuit may be supplied with three phase voltage a, b, c and at one period of time the load current will flow from phase a, through a positive contact, through the load and back over a negative contact. During positive commutation between phases a and b, the load current divides between these two phases by simultaneously closed positive contacts.

For the purpose of simplification, I have shown in Figure 2 the switching structure which is used at phase a, it being understood that the switch apparatus for phases b and c are identical in construction.

The details of the contact assembly units 71, 72 are described in my copending application Serial No. 307,067, filed August 29, 1952, and the details of the push rod assembly 62 and 63 are described in copending application Serial No. 307,024, filed August 29, 1952.

In operation, energy from the generator 1 is fed through the power transformers 11 to the main winding 3 of the commutating reactor 13 and to the load 5 by means of closed contacts in the contact converter 15.

The commutating reactor 13 consists of a coil 3 of conducting material and a core 33 which is saturable at relatively low current values. The core is made of wound tape, as seen in Figure 6, and therefore has no air gap. By reason of the use of a tape, the magnetic flux flows in the circumferential direction of the wound tape. Accordingly, the flux does not cross any air gaps. In order to reduce eddy currents, the tape is made extremely thin, being usually of the order of from 0.001 to 0.002 inch thick.

The coil around the core should be wound as tightly as possible. This permits the use of a small core for a predetermined amount of wire that must be used; it also reduces the reactance of the core when the core is saturated and the coil assumes the properties of an air reactor of the same dimensions.

The best core material for commutating reactors known up to now is vacuum fused 50% iron, 50% nickel alloy, and must not contain any impurities such as oxygen, carbon, other metals, etc. In order to maintain its crystallinic structure, it should not be deformed after annealing. Insulation such as magnesium oxide is provided between the layers of the tape of the property to withstand the annealing temperatures. The tape is cold rolled down to the final thickness and annealed at 1950° F. in electrolytic hydrogen with no water vapors present.

The outstanding property of a commutating reactor is the great variation in physical behavior it affords at different currents. Whenever the total ampere-turns around the reactor core are higher than a predetermined minimum, the reactor behaves exactly as if it were a copper coil wound around a non-magnetic core. It has a predetermined resistance and reactance of relatively low value.

As soon as the total ampere-turns are reduced to near zero and changed into the opposite direction, the reactor suddenly assumes a reactance which is 50,000 or 100,000 times higher than at the larger currents. This transition happens always at the same current value and is instantaneous.

A high voltage must now be applied to the winding of the coil which carries only a very small current, i.e., the so-called magnetizing current. This current is almost constant and is almost independent of the voltage applied. This period of high reactance lasts for a relatively short time interval in each cycle with the exactly defined condition that the voltage applied to the coil, times this time interval is always constant. After the end of the time interval, the coil has again the properties of an air core reactor, the core reactance becomes negligibly small and the current suddenly rises again to a value which is limited only by external means, such as a load.

Figure 7:
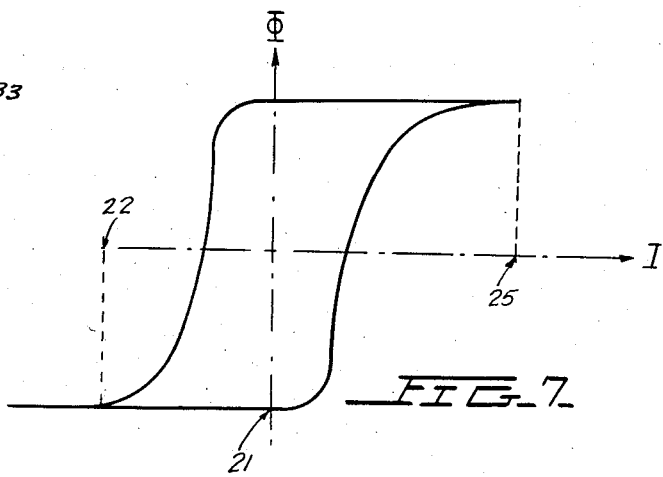
Figure 7 is a hysteresis loop for the reactor utilizing the core of Figure 6.

The proportion of the abnormal behavior of the commutating reactor is usually described by its flux-current curve shown in Figure 7, inappropriately called hysteresis loop. This curve (Figure 7) resembles a rectangle with the horizontal parts (extending to the infinite) indicating the normal low reactance behavior and the almost vertical parts indicating the high reactance part.

This latter portion is characterized by the low current which cannot be allowed to increase during the above mentioned time interval. This current is called magnetizing current, or step current, and the time interval the step length, i.e., the time during which the current is actually frozen, to the small value of the step current. The step current of practically used commutating reactors is less than one thousandth of the peak current, the step length approximately one one-thousandth second and the rise of the flux after the end of the step is less than 4% of the step length.

From the above, it will now be clear that during most of the current cycle, as for example, current values from 25 (Figure 7) and higher, the reactor is saturated. Accordingly, as shown, there is no flux change and the reactor presents substantially no impedance to the circuit. Accordingly, during this portion of the cycle, all or almost all of the voltage of the generator 1 appears across the load 5.

However, during a relative small part of the cycle when the current has just passed through zero value reversing its polarity from positive to negative as at 21 (Figure 7) and is increasing to 22, commutating reactor 13 is saturated. At this low current value, due to rapid change in flux from 21 to 22 (Figure 7) the reactor 13 presents a very much higher reactance than the load. Due to this high impedance, the current is held low and all or substantially all the voltage of the generator appears across the reactor.

The first embodiment of my novel winding may be seen in conjunction with Figures 3, 4 and 5, in which Figure 3 shows a top view of a toroidal winding encircling an enclosed magnetic core, which could be of the type shown in Figure 6. Figure 4 is a view of Figure 3 with the uppermost conductors which connect the inner and outer conductors removed to afford observation of the manner in which the under layer of upper conductors connect their respective inner and outer conductors, and Figure 5 is another top view of Figure 3 wherein all of the upper conductors are removed and connections at the bottom of the reactor are indicated in dotted lines.

In each of Figures 3, 4 and 5, it is seen that a first terminal 80 is connected to the upper conductor member 81, and this upper conductor member 81 is then connected in turn to the inner conductor 82. As specifically seen in Figure 5, the inner conductor 82 is connected at its bottom to a connecting member 83 which then goes to the bottom outer conducting member 84. The top of conductor 84 is then connected to the connecting member 85 of Figure 3, which passes over the connecting member 81 and is connected to the top of inner conductor 86. From the bottom of inner conductor 86, a connection is then made to the bottom of the outer conductor 87.

It is to be noted that the two inner conductors 82 and 86 are radially displaced from one another and are in overlapping relationship with one another. By providing this type of construction, it is seen that the radial dimension of the inner conductors 82 and 86 may be small as their peripheral dimension is large, and still maintain a predetermined cross-sectional area.

The toroidal winding is then completed in a manner as has been previously described and the cyclic connection, which may be best seen in Figures 4 and 5 is made in the conductor sequence of outer conductor 87, inner conductor 88, outer conductor 89, inner conductor 90, outer conductor 91, inner conductor 92, outer conductor 93, inner conductor 94, outer conductor 95, inner conductor 96, outer conductor 97, inner conductor 98 and finally the second terminal 99.

The conductors which interconnect the inner and outer conductors at the top, may be specifically seen in Figure 3, where the top conductor 85 connects the inner and outer conductors 84 and 86, the top conductor 100 connects the inner and outer conductors 88 and 87, conductor 101 connects the inner and outer conductors 100 and 89, top conductor 102 connects inner and outer conductors 92 and 91, top conductor 103 connects inner and outer conductors 94 and 93, top conductor 104 connects inner and outer conductors 96 and 95 and finally, the top conductor 105 connects the inner and outer conductors 98 and 97.

It is to be understood that the same type of connection between the inner and outer conductors would be afforded at the bottom of the reactor winding and will not be set forth here.

It is seen that in the winding shown in Figures 3 through 5, that the inner conductors are positioned along two radial diameters. In view of this novel positioning their peripheral lengths may be increased, whereby their radial dimension is decreased in order to minimize eddy current effects.

Figure 8:
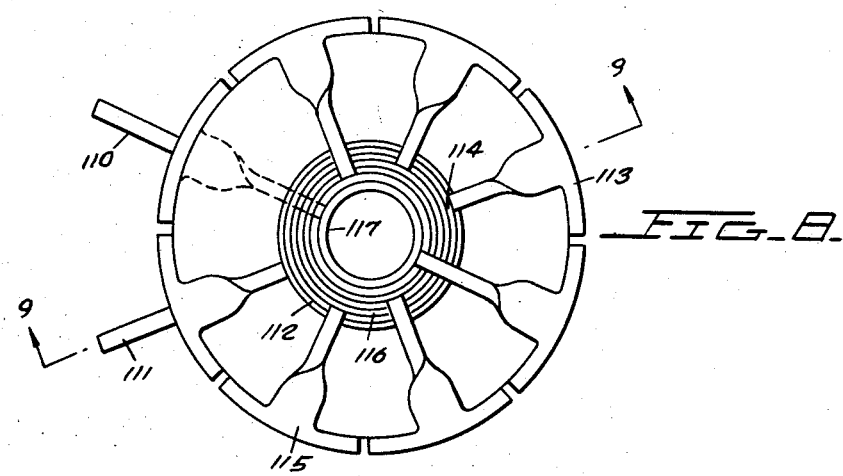
Figure 8 is a top view of a second embodiment of my novel toroidal winding, wherein the inner conductors are hollow concentric cylinders.
Figure 9:
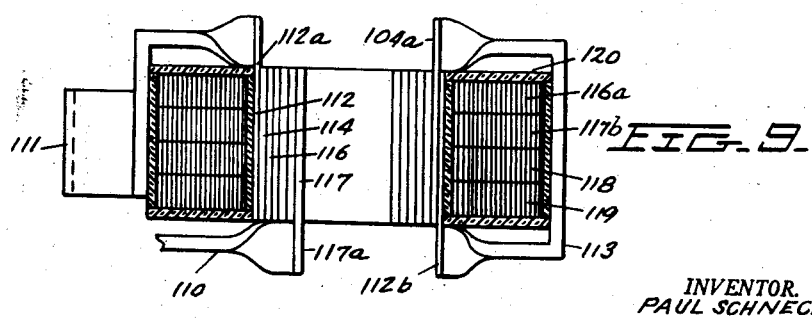
Figure 9 is a sectional view of Figure 8, taken across the lines 9—9.

The second embodiment of my novel invention may be seen with reference to Figures 8 and 9, wherein the inner conducting members of the toroidal winding comprise a plurality of concentric hollow cylinders. More specifically, Figure 8 shows a winding having the terminals 110 and 111 wherein the terminal 111 is connected to the tubular inner conductor 112 at the protruding portion 112a of the conductor 112. This connection is facilitated by projecting portion 112a of the conductor 112 to a greater height than the height of the adjacent tubular inner conductors in the manner shown in Figure 9. The bottom of the tubular conductor 112 is then provided with a similar projection seen in Figure 9 as projection 112b, which is electrically connected to the bottom of the outer conductor 113, to complete the first turn. The top of conductor 113 is then connected to the tubular conductor 114 at the projection portion 114a at the top of the tubular conductor 114, and the bottom of the conductor 114 is then attached to the next outer conductor, seen in Figure 8 as the outer conductor 115. Outer conductor 115 is then connected to the top of the tubular conductor 116, which in turn is connected to the bottom of the next outer conductor and this process is continued until the winding is completed, and the last inner conductor 117 is connected at its bottom protrusion 117a to the second terminal 110.

It is to be realized that each tubular inner conductor is, of necessity insulated from the next conductor in order that the winding is not short circuited.

Furthermore, since the inner conductors having a larger diameter may have a smaller radial dimension for the cross-sectional area, the radial dimension of the inner conductors may be decreased as they are positioned at further radial positions.

It is of interest to note that in the case of Figure 9, it is illustrated that the magnetic core may be comprised of four individually wound cores 116a, 117b, 118 and 119. The cores 116 through 119, are further seen as being encased in an insulated housing 120, and the windings are then placed around this insulated housing 120.

The portion of the winding which connects to the inner conductor, such as conductor 113, is more specifically shown in Figure 9, as comprising a continuous U-shaped winding wherein each leg lies in the same plane. Its ends are then fashioned in such a form that the connecting ends are twisted by 90° and offer a relatively large surface for welding or soldering operation.

It is to be noted that this offers a considerably simplified manufacturing procedure in which the upper and lower legs of the U-shaped winding lie in intersecting planes.

In the foregoing, I have described my invention only in connection with preferred special embodiments thereof. Many variations and modifications of the principles of my invention within the scope of the description herein are obvious. Accordingly, I prefer to be bound not by the specific disclosure herein but only by the appending claims.

I claim:

1. A commutating reactor comprising a ring shaped core of highly saturable type magnetic material and a toroidal winding wound thereon; said toroidal winding comprising a plurality of conductors of small radial dimension positioned within the opening formed by said ring shaped core, a plurality of outer conductors, and connecting conductors; said connecting conductors being constructed to interconnect said plurality of inner and outer conductors cyclically to form a continuous conductor of toroidal form; the inner conductors of adjacent turns being respectively formed from a first and second hollow conductive cylinder held in insulated relationship with respect to one another; the inner conductors of adjacent turns of said continuous toroidal winding being radially displaced from one another and overlapping one another in a peripheral direction; a substantially large cross-sectional area of said inner conductors thereby being obtained by maintaining a relatively small radial dimension to decrease eddy current effects and providing a relatively large peripheral dimension.

2. A commutating reactor comprising a ring shaped core of highly saturable type magnetic material and a toroidal winding wound thereon; said toroidal winding comprising a plurality of conductors of small radial dimension positioned within the opening formed by said ring shaped core, a plurality of outer conductors and connecting conductors; said connecting conductors being constructed to interconnect said plurality of inner and outer conductors cyclically to form a continuous conductor of toroidal form; at least one of said plurality of inner conductors being radially displaced from another of said plurality of radial conductors and being in overlapping relationship therewith; the peripheral dimensions of said inner conductors thereby being elongated to have a decreased radial dimension for a predetermined cross-sectional area; said inner conductors being formed from a first and second concentric hollow conductive cylinder held in insulated relationship with respect to one another.

3. A reactor comprising a ring shaped core of magnetic material and a toroidal winding wound thereon; said toroidal winding having a first and second turn; each of said first and second turns including inner conductors and an outer conductor; connecting means for cyclically connecting said inner conductors and outer conductor of said first and second turns to form said toroidal winding; said inner conductors of said first and second turns being radially displaced from one another, the peripheral dimensions of said first and second inner conductors overlapping one another whereby the radial dimension of said first and second inner conductors may be substantially decreased for a required cross-sectional area to thereby decrease eddy current effects; said first and second inner conductors being formed of a respective hollow conductive cylinder concentrically positioned with respect to one another and in insulated relationship with respect to one another.

4. A reactor comprising a ring shaped core of magnetic material and toroidal winding wound thereon; said toroidal winding having a first and second turn; each of said first and second turns including inner conductors and an outer conductor; connecting means for cyclically connecting said inner conductors of said first and second turns and outer conductor of said first and second turns to form said toroidal winding; said first and second inner conductors being concentric hollow cylinders of relatively small radial dimension.

5. A commutating reactor comprising a ring shaped core of highly saturable type magnetic material and a toroidal winding wound thereon; said toroidal winding comprising a plurality of conductors of small radial dimension positioned within the opening formed by said ring shaped core, a plurality of outer conductors, and connecting conductors; said connecting conductors being constructed to interconnect said plurality of inner and outer conductors cyclically to form a continuous conductor of toroidal form; said plurality of inner conductors being constructed to form concentric hollow cylinders.

References Cited in the file of this patent

UNITED STATES PATENTS

| | | |
|---|---|---|
| 1,320,980 | Bowman | Nov. 4, 1917 |
| 1,994,767 | Heintz | Mar. 19, 1935 |
| 2,437,513 | Gethmann | Oct. 12, 1946 |
| 2,709,791 | Anderson | May 31, 1955 |
| 2,759,128 | Jensen | Aug. 14, 1956 |